United States Patent
Lublow et al.

(10) Patent No.: US 10,526,716 B2
(45) Date of Patent: Jan. 7, 2020

(54) METAL CHALCOGENIDE THIN FILM ELECTRODE, METHOD FOR THE PRODUCTION THEREOF AND USE

(71) Applicant: Technische Universitaet Berlin, Berlin (DE)

(72) Inventors: Michael Lublow, Berlin (DE); Anna Fischer, Berlin (DE); Matthias Driess, Berlin (DE); Thomas Schedel-Niedrig, Kleinmachnow (DE); Marcel-Philip Luecke, Vaihingen an der Enz (DE)

(73) Assignee: TECHNISCHE UNIVERSITAET BERLIN, Berlin (DE)

( * ) Notice: Subject to any disclaimer, the term of this patent is extended or adjusted under 35 U.S.C. 154(b) by 0 days.

(21) Appl. No.: 15/101,639

(22) PCT Filed: Dec. 4, 2014

(86) PCT No.: PCT/EP2014/076591
§ 371 (c)(1),
(2) Date: Jun. 3, 2016

(87) PCT Pub. No.: WO2015/082626
PCT Pub. Date: Jun. 11, 2015

(65) Prior Publication Data
US 2016/0305035 A1    Oct. 20, 2016

(30) Foreign Application Priority Data
Dec. 4, 2013  (DE) .................. 10 2013 224 900

(51) Int. Cl.
*C25D 9/08*     (2006.01)
*C25D 5/50*     (2006.01)
(Continued)

(52) U.S. Cl.
CPC ............... *C25D 9/08* (2013.01); *C01B 33/20* (2013.01); *C01G 3/02* (2013.01); *C01G 3/04* (2013.01);
(Continued)

(58) Field of Classification Search
CPC ....................................... C25D 9/08
See application file for complete search history.

(56) References Cited

U.S. PATENT DOCUMENTS

2006/0067874 A1    3/2006 Fetcenko et al.
2009/0260991 A1*   10/2009 Ito .................. C25D 9/08
                                                    205/58
(Continued)

FOREIGN PATENT DOCUMENTS

DE     1195285      6/1965
JP     S5648125     4/1981
JP     2008231516   10/2008

OTHER PUBLICATIONS

"Solubility of Oxygen in Organic Solvents and Calculation of the Hansen Solubility Parameters of Oxygen" by Sato et al., Ind. Eng. Chem. Res. 53, pp. 19331-19337 (2014).*
(Continued)

Primary Examiner — Brian W Cohen
(74) Attorney, Agent, or Firm — Fox Rothschild LLP (57) ABSTRACT

The invention relates to a method for producing a metal chalcogenide thin film electrode, comprising the steps:
(a) contacting a metal or metal oxide with an elementary halogen in a non-aqueous solvent, producing a metal halide compound in the solution,
(b) applying a negative electric voltage to an electrically conducting or semiconducting substrate which is in contact with the solution from step (a), and
(c) during and/or after step (b) contacting the substrate with an elementary chalcogen forming a metal chalcogenide layer on the substrate.

(Continued)

The invention also relates to a metal chalcogenide thin film electrode which can be produced by the method and its use as an anode for releasing oxygen during (photo)electrochemical water splitting.

16 Claims, 7 Drawing Sheets

(51) Int. Cl.
```
C25D 7/12       (2006.01)
C25D 3/66       (2006.01)
C25D 5/34       (2006.01)
C25D 5/00       (2006.01)
C01G 49/10      (2006.01)
C01G 51/08      (2006.01)
C01G 53/08      (2006.01)
C01G 3/04       (2006.01)
C25B 11/04      (2006.01)
C25B 1/00       (2006.01)
C01G 49/02      (2006.01)
C01G 51/04      (2006.01)
C01G 53/00      (2006.01)
C01G 53/04      (2006.01)
C01G 3/02       (2006.01)
C01B 33/20      (2006.01)
C01G 51/00      (2006.01)
```
(52) U.S. Cl.
CPC .......... *C01G 49/02* (2013.01); *C01G 49/10* (2013.01); *C01G 51/04* (2013.01); *C01G 51/08* (2013.01); *C01G 51/40* (2013.01); *C01G 53/00* (2013.01); *C01G 53/006* (2013.01); *C01G 53/04* (2013.01); *C01G 53/08* (2013.01); *C25B 1/003* (2013.01); *C25B 11/0452* (2013.01); *C25D 3/66* (2013.01); *C25D 5/003* (2013.01); *C25D 5/34* (2013.01); *C25D 5/50* (2013.01); *C25D 7/12* (2013.01); *C01P 2002/85* (2013.01); *C01P 2004/03* (2013.01); *C01P 2006/40* (2013.01)

(56) References Cited

U.S. PATENT DOCUMENTS

2013/0037417 A1* 2/2013 Jia ..................... C25B 1/003
                                               205/635
2013/0180848 A1* 7/2013 Lee ................. C25B 11/0478
                                               204/242

OTHER PUBLICATIONS

"Anodic Dissolution of Tantalum and Niobium in Acetone Solvent with Halogen Additives for Electrochemical Synthesis of Ta2O5 and Nb2O5 Thin Films" by Kamada et al., Electrochimica Acta 49, pp. 321-327 (2004).*
Yuxin Yin et al: "Enhanced solar water-splitting efficiency using core/ sheath heterostructure CdS/TiO2 nanotube arrays", Nanotechnology, 10P, Bristol, GBBd. 18, Nr. 49, Dec. 12, 2007 (Dec. 12, 2007), Seite 495608, XP020129592.
Baranski A S et al: "The Electrodeposition of Metal Chalcogenides", Journal of the Electrochemical Society, Electrochemical Society, Bd. 12, Nr. 3, Mar. 1980.
Jayakrishnan R et al: "Non-aqueous electrodeposition of ZnO and CdO films", Thin Solid Films, Elsevier-Sequoia S.A. 13,14 Lausanne, CH, Bd. 440, Nr. 1-2, 2003.
Zhitomirsky I: "Cathodic electrodeposition of ceramic and organoceramic materials. Fundamental aspects", Advances in Colloid and Interface Science, Bd. 97, Nr. 1, 2002.
Gary Hodes: "Electrodeposition of II-VI 1,13 Semiconductors"; "11" In: Israel Rubinstein: "Physical Electrochemistry", 1995, Marcel Dekker, New York.
International Search Report dated Apr. 4, 2015 in PCT/EP2014/076591.
Kamada, K.; Mukai, M.; Matsumoto, Y.: Electroceposition of titanium(IV) oxide film from sacrificial titanium anode in I2-added acetone bath. In: Electrochimica Acta 47, 2002, 3309-3313.
Walter, M. G. et al.: Solar water splitting cells. In: Chemical Reviews, 110, 2010, 11, 6446-6473.
Cook, T. R. et al.: Solar energy supply and storage for the legacy and nonlegacy worlds. In. In: Chemical Reviews, 110, 2010, 10, 6474-6502.

* cited by examiner

METAL CHALCOGENIDE THIN FILM ELECTRODE, METHOD FOR THE PRODUCTION THEREOF AND USE

CROSS-REFERENCE TO RELATED APPLICATIONS

This application is a § 371 U.S. National Stage of International Application No. PCT/EP2014/076591, filed Dec. 4, 2014, which claims priority to and the benefit of German Application No.: 10 2013 224 900.4, filed Dec. 4, 2013, the entireties of which are both hereby incorporated herein by reference.

The invention relates to a method for producing a metal chalcogenide thin film electrode, a metal chalcogenide thin film electrode which can be produced by the method and its use for electrochemical water splitting.

The inexpensive and environmentally friendly production of hydrogen by means of (photo)electrochemical water splitting ($H_2O \rightarrow H_2 + \frac{1}{2} O_2$) is a key challenge for the production of alternative fuels, for example for fuel cells. Two part reactions take place at the electrodes during electrolysis: at the cathode there is the reduction of protons to hydrogen ($2H^+ + 2\ e^- \rightarrow H_2$) and at the anode the oxidation of oxygen ($O^{2-} \rightarrow \frac{1}{2} O_2 + 2\ e^-$). For good overall efficiency both part reactions should take place at a high and comparable speed. Currently, the development of oxygen at the anode (i.e.: OER for oxygen evolution reaction) represents the limiting reaction and is why improved electrode materials are wanted for this purpose. Photoactive anode materials are particularly desirable which enable solar-powered photoelectrochemical water splitting. Improved catalytic electrode materials are needed to lower the overpotential at the anode.

Transition metal oxides are a particularly active material class for the (photo)electrochemical development of oxygen in water-splitting electrode systems (Cook et al., Chem. Rev. 110 (2010), S. 6474-6502; Walter et al., Chem. Rev. 110, (2010), S. 6446-6473). The manufacture of suitable electrodes is mostly based on the oxidation (in anodic conditions) of metal precursors, i.e. on the deposition of metals during electrode positioning on an electrode (the substrate) and their oxidation in the presence of water. For example, the electrochemical deposition of $RuO_2$ films onto an FTO substrate from an aqueous $RuCl_3$ solution (Tsuji et al., Electrochim. Acta 56, (2011), S. 2009-2016) is known.

A further approach involves electrophoretically transporting previously chemically or electrochemically formed metal oxide clusters onto an electrode surface. For example, a method is described for the electrolytic deposition of $TiO_2$ films onto a platinum cathode in Kamada et al. (Kamada et al., Electrochimica Acta 47 (2002), 3309-3313). In this case a titanium sacrificial anode is used as a counter electrode to the platinum cathode functioning as a substrate for the $TiO_2$ deposition and the reaction is performed in acetone containing $H_2O$ traces in the presence of iodine ($I_2$). In this case titanium is oxidised by oxidation by means of iodine with in the presence of water to $TiO^{2+}$, released from the sacrificial anode and because of the electric field transported in the direction of the cathode. The deposition on the Pt cathode takes place there as $TiO(OH)_2$ and the release of $H_2$ and subsequent transformation into $TiO_2$. To perform the electrophoretic transport of the titanium-yl ions to the cathode this procedure requires an electrically conductive cathode.

It is also known from the literature that the formation of a metal oxide (in solution) can take place under reducing conditions in which the coupling reaction of organic molecules (ketones) to olefins can take place known as a McMurry-reaction (McMurry & Fleming, J. Am. Chem. Soc. 96 (1974), S. 4708-4709). Here a combination of $LiAlH_4$ and $TiCl_3$ is used in which the lithium aluminium hydride Ti(+III) is partially reduced to Ti(+II) which reacts in turn with the ketone. Titanium dioxide is released as a by-product.

The underlying objective of the invention is to propose a method for producing a metal-chalcogenide thin film electrode for electrocatalytic development of oxygen during electrochemical water splitting, which is simple to perform and is ideally based on inexpensive starting materials. The electrodes produced by means of the method should exhibit good activity with respect to electrocatalytic oxygen development, and ideally should be photoactive. In addition, the produced metal chalcogenide layer should have high stability.

Said objectives are achieved fully or partly by means of a method for producing a metal chalcogenide thin film electrode, a corresponding electrode that can be produced by means of the method as well as its use having the features of the independent claims.

The method according to the invention for producing a metal chalcogenide thin film electrode comprises the steps:
(a) contacting a metal or metal oxide with an elementary halogen in a non-aqueous solvent, producing a metal halide compound in the solution,
(b) applying a negative electric voltage to an electrically conducting or semiconducting substrate which is in contact with the solution from step (a), and
(c) during and/or after step (b) contacting the substrate with an elementary chalcogen forming a metal chalcogenide layer on the substrate.

Thus according to the invention from the metal or metal oxide, from which the later metal chalcogenide layer is to be formed, an interim metal halide compound is generated in solution (step a), wherein the metal or the metal oxide is partially dissolved. Afterwards electrochemical complexing and deposition are performed (step b), in that the substrate, on which the thin film is to be deposited, is charged in the metal halide-containing solution with a negative voltage, i.e. is switched cathodically with respect to an anode. In contrast to known electrophoretic deposition the negative charging of the substrate does not result in the formation of an electric field, which directs particle migration, but results in the substrate functioning as an electron transmitter during the electrochemical reduction reaction. It is particularly advantageous that thus in step (b) the metal is deposited onto the substrate by reduction and due to the negative voltage the substrate is an electron transmitter during the reduction. The contacting of the deposited film with the elementary chalcogen in step (c) (during or after step b) finally leads to the formation of the metal chalcogenide compound.

At the same time and/or afterwards the elementary chalcogen is reduced by receiving electrons from the negative cathode (substrate) and reacts with the metal cations of the metal halide to the corresponding metal chalcogenide, which is deposited on the surface of the substrate. The method results in the formation of a highly compact and very stable metal chalcogenide layer on the substrate. The thus produced metal chalcogenide layer has high activity with regard to electrochemical anodic oxygen development during electrochemical water splitting.

Preferably a metal is used which is able to form a metal halide compound in which the metal is present in oxidation state +2 or above, i.e. can bond two or more halide anions. Compared to metals which can only be present in monovalent form (oxidation state +1) bivalent or higher state metals can result surprisingly in greater chalcogenide deposits. The reason for this is presumably the better complexing of the bivalent or higher state metal cations by the solvent used.

In a preferred embodiment of the invention the metal is a transition metal. Preferably, it is selected from the group consisting of iron (Fe), cobalt (Co) and nickel (Ni), as well as mixtures and alloys which comprise the latter or consist of the latter. In this case the alloy or mixture can also contain metals for which the formation of a halide at ambient temperature is not documented, such as chromium (Cr) or manganese (Mn). These metals are also co-deposited by means of the method according to the invention as metal chalcogenide. In this way mixed metal chalcogenide layers can be deposited, for example mixed oxides of different metals, whereby the catalytic properties of the electrode can be modified.

A particular advantage of the method is that solid metal bodies can be used as the starting metal, in particular industrial metals or scrap metals. In this way inexpensive raw materials can be used as the starting material, if necessary after chemically or mechanically cleaning the metal.

The term "chalcogen" refers to the elements in the 6th main group of the periodic table of elements. Preferably within the scope of the present invention the chalcogens include elementary oxygen, elementary sulphur or elementary selenium. In this way by means of the method metal oxide, metal sulphide or metal selenide layers can be produced. The preferably produced metal oxides are in particular nickel oxides $Ni_xO_y$, cobalt oxides $Co_xO_y$ and iron oxides $Fe_xO_y$. Different metal sulphides have particularly good electrocatalytic properties on suitable photoactive substrates so that they can be used in photovoltaic water electrolysis. This includes in particular iron sulphides, such as iron disulphide $FeS_2$ (pyrite), or various CuZnSnS-compounds, such as kesterite $Cu_2(Zn,Fe)SnS_4$. Compared to methods of the prior art which use hydrogen sulphide for the production of corresponding sulphides, the method according to the invention provides a less toxic method of preparation.

The substrate itself is not chemically involved in the various different reactions of the method, in particular it is not used in the manner of a sacrificial anode as in the prior art as the provider of the metal or other reaction components. For the electrochemical deposition of the metal chalcogenide and for later use as an electrode it is only necessary for the substrate to be electrically conductive or semiconductive and to function as an electron donor. For example, fluorine-doped tin oxide (FTO fluorine doped tin oxide) is used as the substrate. Alternatively, an n-semiconductor material is used as the substrate which produces defective electrons (holes) under the effect of light, i.e. is photoactive. n-semiconductor materials are particularly suitable for use as photoanodes for the development of oxygen during water electrolysis. In this case the defective electrons produced under the effect of light are transported from the substrate into the metal chalcogenide layer in order to reach from there the solid body/electrolyte boundary and to catalyse the oxidation of $O^{2-}$ to $O_2$. In particular, n-doped silicon is a possible n-semiconductor material for the substrate.

On the deposition of the metal oxide film oxide-free, conductive substrates are particularly preferred, in order to avoid a reductive dissolution of the substrate and the associated formation of water. Silicon (etched) is therefore a preferred choice both for the cathode, on which the film is to be deposited, and for the anode, which is used for completing the closed circuit as an electron acceptor. In order to ensure as far as possible the absence of water in the solvent, it is an advantage to seal the electrochemical cell, from which the metal oxide film is deposited, from the environment (i.e. from environmental air), in order to prevent the penetration water from humidity. In this embodiment of the invention the formation of carbonic acid from the carbon dioxide in the air can also be prevented.

For producing the metal halide in step (a) of the method an elementary halogen is used. Suitable elementary halogens comprise in particular iodine $I_2$, which can be used as a solid material, or bromine $Br_2$, which can be sputtered into the solvent as a gas. Preferably, crystalline iodine is used.

An organic solvent is preferably used as the non-aqueous solvent. Particularly preferably, the organic solvent comprises a carbonyl group (CO) or cyanide group (CN). It is assumed that such solvents coordinate the metal cation of the halide compound with the free electron pairs of the carbonyl or cyanide group and thus activate them for the following reaction with the cathode-generated chalcogenide anion. In addition, it has been observed surprisingly that the solvent participates in the reaction with the co-deposition of carbon or carbon-containing compounds. The proportion of carbon and/or carbon-containing compounds in the produced metal chalcogenide layer is up to 30 atomic percent. The proportion of carbon and/or carbon-containing compounds in the thin film originating from the solvent results in an unexpected compaction of the metal chalcogenide thin layer and thus to improved stability and imperviousness. The imperviousness is particularly important when using a semiconductor material as the substrate, which typically has to be protected from contact with an aqueous electrolyte in an electrochemical cell. Furthermore, by embedding carbon and/or carbon-containing compounds in the thin film the loading transport between the substrate and metal chalcogenide can be improved.

The method is performed as far as possible with the exclusion of water, as the latter inhibits the formation of metal chalcogenide. Preferably, the proportion of water in the used non-aqueous solvent is at most 0.2 wt. %, particularly preferably at most 0.1 wt. %.

In a preferred embodiment the remaining water is driven out of the solvent prior to the deposition and/or before the formation of the halide. This is preferably performed by pre-electrolysis, wherein for example two electrodes are introduced into the solvent already containing halogen. By applying a voltage to the two electrodes (in particular in a range of 5 to 20 V, preferably of 7 to 12 V, particularly preferably 10 V) the remaining water is decomposed, and oxidation takes place at one of the electrodes (the anode), whereas at the other electrode (the cathode) molecular hydrogen is formed which leaves the electrolyte as gas.

Contacting the electrochemically modified substrate with the elementary chalcogen to form metal chalcogenide can be performed in a different way. On the one hand the chalcogen can already be present in the solvent or can be actively added to the latter. For example, the solvent can contain traces of dissolved oxygen or oxygen can be introduced by stirring into the solution. If using sulphur or selenium as the chalcogen, elementary sulphur or elementary selenium can be added to the solution. Alternatively, the chalcogen can be present in the atmosphere, such as for example oxygen, which is already present in the atmosphere, or can be actively added to the atmosphere. In this case the substrate can be brought into contact with the atmosphere after removal from the solution after step (b) and thus into contact with the chalcogen, so that then the metal chalcogenide is formed on the surface of the substrate. This procedure is particularly suitable when a metal oxide layer needs to be produced and thus the atmospheric oxygen can be used.

In a preferred embodiment of the invention after forming the metal chalcogenide layer on the substrate a chemical or electrochemical aftertreatment of the deposited layer is performed for stabilising, for example for increasing the oxidation state of the metal cation. This can be performed by electrochemical processing in aqueous hydroxide-containing electrolytes.

In a particularly preferred embodiment of the invention after forming the metal chalcogenide layer on the substrate or after the aforementioned (electro)chemical aftertreatment a thermal aftertreatment is performed. In this way the structure consisting of the substrate and metal chalcogenide layer deposited thereon is treated at temperatures in a range of 150 to 800° C., in particular 150 to 500° C., preferably 200 to 400° C., for a duration of 1 min to 10 h, in particular for a duration of 1 to 30 min. The thermal aftertreatment, also referred to as "annealing", results in an increase in the crystallinity and/or the photoactivity of the deposited layer. The specific conditions are mainly directed towards the chalcogen and the desired crystallinity.

A further aspect of the invention relates to a metal chalcogenide thin film electrode, which can be produced by the method according to the invention. The electrode comprises an electrically conducting or semiconducting substrate and a thin film of a metal chalcogenide compound deposited thereon. The electrode produced by the method according to the invention is characterised in particular in that carbon and/or compounds of carbon can be found in the produced metal chalcogenide thin film. The proportion of carbon and/or carbon-containing compound(s) in the produced metal chalcogenide layer is up to 30 atomic percent. The carbon contributes to the increased strength and imperviousness of the thin film. In this way both the charging transport of the substrate to the metal chalcogenide can be optimised and the stability of the substrate can be increased. The latter is particularly significant when using a semiconductor material which typically needs to protected from contact with an aqueous electrolyte. The metal chalcogenide thin film electrode according to the invention is thus characterised by improved stability. The thin film electrode according to the invention has a layer thickness of the metal chalcogenide layer in a range of 50 to 1000 nm, in particular in a range of 100 to 500 nm. In addition, the deposited layer has a nanostructured surface morphology with average sizes of electron-microscopically identifiable structural elements in a range ≤500 nm.

A further aspect of the present invention relates to the use of the metal chalcogenide thin film electrode according to the invention as an electrode for the development of oxygen for electrochemical water splitting with an applied external potential or under illumination. In other words, the electrode is preferably used as an anode during water electrolysis. In particular, if the substrate is a photoactive semiconductor, such as n-doped silicon, the electrode can be used for photoelectrochemical water splitting, i.e. as a photoanode. The heterostructure of a photoactive semiconductor substrate and metal chalcogenide layer deposited thereon makes it possible with the provision of light to transport defective electrons (holes) out of the semiconductor into the metal chalcogenide layer, in order to reach the solid bodies/electrolyte boundary from there.

Further preferred embodiments of the invention are described in the remaining features defined in the subclaims.

The various different embodiments of the invention mentioned in this application can be combined with one another advantageously, provided they do not have a different configuration in individual cases.

The invention is explained in the following by way of example embodiments with reference to the associated drawings. In the latter.

The method according to the invention is explained in more detail in the following. In this case for a clearer overview iodine is used as the halogen, oxygen is used as the chalcogen and a solid metal body is used as the provider for the metal of the metal chalcogenide layer, but the invention is not restricted to this.

In an optional step 1 a metal is cleaned of any possible surface dirt and/or oxide or hydroxide layers on the surface. The cleaning step can be performed mechanically for example by using abrasive materials such as sandpaper or the like. Alternatively, the cleaning can be performed by chemical treatment, such as for example oxide-dissolving reactions. Preferably, a solid metal body is used as the metal, which can come in particular from industrial metal or scrap metal. Solid bodies of any geometric form can be used, for example in the form of metal sheets, powders or the like. In chemical terms preferably metals are used which comprise iron, cobalt and/or nickel or are made of the latter.

In step 2 the metal halide is formed, here metal iodide. For this purpose the metal possibly cleaned in step 1 is placed into a non-aqueous solvent with a water content of at most 0.2 wt. %. Preferably, acetone or acetonitrile is used as the solvent. A halogen, here crystallised iodine, is added to the solvent in a mass ratio of solvent:iodine of at least 1:1 or a greater amount of iodine. Preferably, ultrasound is applied to the mixture to achieve a better mixing result. The reaction is carried out for a period of at least 5 minutes, preferably at ambient temperature. It is assumed that in this way the iodine, with a partial detachment of metal from the solid body to the corresponding metal iodide in the solution reacts according to the following equation for example:

Electrochemical processing takes place in the next step 3. For this two electrically conductive or semiconductive electrodes are moved into contact with the metal iodide-containing solution from step 2, once the remaining solid metal body has been removed from the latter. One of said electrodes is used as a substrate for the thin film electrode to be produced, whereas the other one represents the counter electrode for electrochemical processing. The substrate electrode is made for example from a metal or a metal alloy, FTO, n-doped silicon or carbon. The counter electrode can be made in principle from the same material or from a different material than the substrate electrode. Voltage is applied to the electrodes, wherein the substrate electrode is allocated a negative voltage, i.e. is connected as a cathode. The applied voltage is ≤−2 Volt, in particular it is within a range of −5 to −10 Volt, wherein the (−) sign refers to the substrate electrode on which the metal oxide film is to be deposited. The electrochemical deposition is preferably performed at ambient temperature. The length of the reaction corresponds to the thickness of the metal oxide layer to be deposited and depends on the applied voltage.

Without wishing to commit to a specific theory it is assumed that the metal iodide in the solution is coordinated by the organic solvent, in particular its carbonyl or cyanide groups with the formation of metal organic complexes. Said complexes exhibit high reactivity compared to free oxygen, which is already present in traces in the solvent or in the environmental air. The oxygen is reduced at the cathode (i.e. negatively) polarised substrate electrode with the capture of electrons to $O^{2-}$ anions which react with the metal halide to form the corresponding metal oxide. This leads to a direct deposition of the metal oxide on the substrate (see following reaction equations). Possibly a reaction with oxygen takes place and the associated metal oxide deposition only upon later contact with the air oxygen, after the still wet, negatively polarised electrode has been removed from the solution.

Although the chemical processes have already been described in detail the organic solvent appears to participate in the reactions such that in the produced metal oxide layer significant proportions of carbon and/or carbon-containing compounds are also deposited.

Afterwards the substrate electrode with the layer deposited thereon is removed from the solvent/iodine-bath. This is preferably performed under dry nitrogen, to enable the evaporation of possibly formed hydrogen iodide with the exclusion of humidity.

In an optional subsequent step 4 a chemical or electrochemical aftertreatment of the deposited layers takes place with the aim of increasing the stability of the metal oxide layer. In particular, the aim of the aftertreatment is to increase the oxidation state of the metal, that is to oxidise the latter further. For this purpose the electrode can be introduced for example into an aqueous hydroxide-containing electrolyte solution and processed electrochemically.

In a further optional step 5 a thermal aftertreatment of the electrode takes place for increasing the crystallinity of the deposited metal chalcogenide layer. For this the electrode is tempered at temperatures in a range of 150 to 800° C. for a duration of 1 minute to 10 hours.

The metal chalcogenide thin film electrode obtained by the method according to the invention are characterised by having a particularly impervious and stable metal chalcogenide layers, which also contain carbon.

EXAMPLES

Measurement Techniques
XPS.
X-ray photoelectron spectroscopy, (XPS), was performed for the chemical analysis of the samples. The allocation of the core contour lines to specific oxidation states was performed using published data (Chastain & King (Ed.), Handbook of X-Ray Photoelectron Spectroscopy, Physical Electronics, Minnesota, USA, 1995).
EDX.
Energy dispersive X-ray analysis (EDX) was performed for chemical element analysis both integrally, i.e. averaging over the whole sample surface, and also locally, i.e. with later resolution (smallest resolution limit about 100 nm) on the scanning electron microscope. The excitation energies were selected so that the expected element-specific K or L lines of the elements can be detected, i.e. between 3 keV and 10 keV. The allocation of the measured X-ray lines was automated by means of database values by the control software (NSS 2.2, Thermo Fisher Scientific, USA).
Electrochemical Characterisation
The electrodes produced in the examples were tested in an electrochemical standard cell with respect to their suitability for generating oxygen in 0.1 mol/l NaOH (pH 13). For this the samples were measured either in a three electrode configuration with a Pt counter electrode and an Ag/AgCl reference electrode or in a two electrode configuration with the short-circuiting of the Pt counter and Ag/AgCl reference electrode. The potential was controlled respectively by a potentiostat (VSP, BioLogic, France).
For photochemical studies lighting was provided using a W-I source of white light (MI-150, Dolan-Jenner, the Netherlands) by fibre optics.

Example 1: Production of an $Ni_xO_y$/FTO Electrode

As the solid metal body 2 cm$^2$ of an extremely pure Ni-metal film (Goodfellow Corp. USA, purity >99.95 wt. %) was placed in a mixture of acetone (15 ml, w ($H_2O$)<0.2%) and iodine crystal powder (80 mg). This mixture was mixed for 5 min in an ultrasound bath at 37 kHz. During this treatment the temperature increased from ambient temperature to about 35° C. Afterwards the metal film was removed from the solution.

FTO films (Solaronix, Switzerland, sheet resistance 7 Ωcm$^2$, 3×1.5 cm) were precleaned with acetone. An FTO sample was placed as a cathode (substrate) and a second as a counter electrode (anode) at a distance of 5-10 mm from another in the acetone solution. A potential of 10 V was applied between the substrate and counter electrode for 5 min.

Afterwards the substrate electrode was removed from the solution and dried.

Example 2: Production of a $Co_xO_y$/FTO Electrode

The method was performed as in example 1, except that as the solid metal body 2 cm$^2$ of an extremely pure Co metal film was used (Goodfellow Corp. USA, purity >99.95 wt. %).

Example 3: Production of a Fe$_x$O$_y$/FTO Electrode

The method was performed as in example 1, except that as the solid metal body 2 cm$^2$ of an extremely pure Fe metal film was used (Goodfellow Corp. USA, purity >99.95 wt. %).

Example 4: Production of a Cu/FTO Electrode

The method was performed as in example 1, except that as the solid metal body 2 cm$^2$ of an extremely pure Cu metal film was used (Goodfellow Corp. USA, purity >99.95 wt. %).

Examples 5-8: Production of Different M$_x$O$_y$/Si(100) Electrodes

The method was performed as in examples 1-4, except that 2 cm$^2$ of an n-type Si(100) wafer (ABC Company, Germany; doping $N_D$~$6\times10^{15}$) was used as the substrate electrode (cathode) respectively. For the pre-treatment the Si(100) wafer was precleaned with ethanol and water and then chemically etched in a solvent mixture of hydrofluoric acid (50%) and ethanol (HF:C$_2$H$_5$OH=3:1) for 30 s and 10 s, then rinsed with water and dried with N$_2$. FTO was used as the counter electrode as in examples 1-3 FTO.

Examples 9-12: Production of Different M$_x$O$_y$/Si(111) Electrodes

The method was performed as in examples 1-4, except that 2 cm$^2$ of an n-type Si(111) wafer (ABC Company, Germany; doping $N_D$~$6\times10^{15}$) was used as the substrate electrode (cathode) with. For the pre-treatment the Si(111) wafer was precleaned with ethanol and water and then chemically etched firstly with NH$_4$F (100 s) and then with hydrofluoric acid (50%, 10 min) and then dried with N$_2$. FTO was used as a counter electrode as in examples 1-3.

Example 13: Production of a Mixed Oxide/FTO Electrode

The method was performed as in example 1, but instead as the solid metal body 2 cm$^2$ of a steel alloy of the metals Fe/Si/Ni/Cr/Co/Mn was used. Furthermore, unlike example 1 the sample was tempered after drying at 300° C. for 10 min.

Example 14: Production of a CoO/ZnO/CoZnO/Si Electrode

The method was performed as in example 1, but instead chemically synthesized CoZnO nanoparticles were used and n-doped Si(100) was used as the substrate.

The substrates and metals used in the examples 1 to 14 are listed in table 1.

TABLE 1

| Example | Substrate | Metal/metal oxide | Chalcogen |
|---|---|---|---|
| 1 | FTO | Ni | ◯ |
| 2 | FTO | Co | ◯ |
| 3 | FTO | Fe | ◯ |
| 4 | FTO | Cu | ◯ |
| 5 | Si(100) | Ni | ◯ |
| 6 | Si(100) | Co | ◯ |
| 7 | Si(100) | Fe | ◯ |
| 8 | Si(100) | Cu | ◯ |
| 9 | Si(111) | Ni | ◯ |
| 10 | Si(111) | Co | ◯ |
| 11 | Si(111) | Fe | ◯ |
| 12 | Si(111) | Cu | ◯ |
| 13 | FTO | Steel (FeSiNiCrCoMn) | ◯ |
| 14 | Si(100) | CoZnO nanoparticles | ◯ |

Comparison Example 1: Production of an Ni$_x$O$_y$/Si(100) Electrode in the Presence of Water The method of production was as described in example 5 with the use of an Ni metal film and crystalline iodine, but instead of the acetone a solvent mixture of acetone and 25 volume % H$_2$O was used.

Comparison Example 2: Production of a Fe$_x$O$_y$/Si(100) Electrode in the Presence of Water The method was performed as described in example 7 except that instead of acetone a solvent mixture of acetone and 25 volume % H$_2$O was used.

Characterisation of the Produced Metal Oxide Thin Film Electrodes

Figure 1:
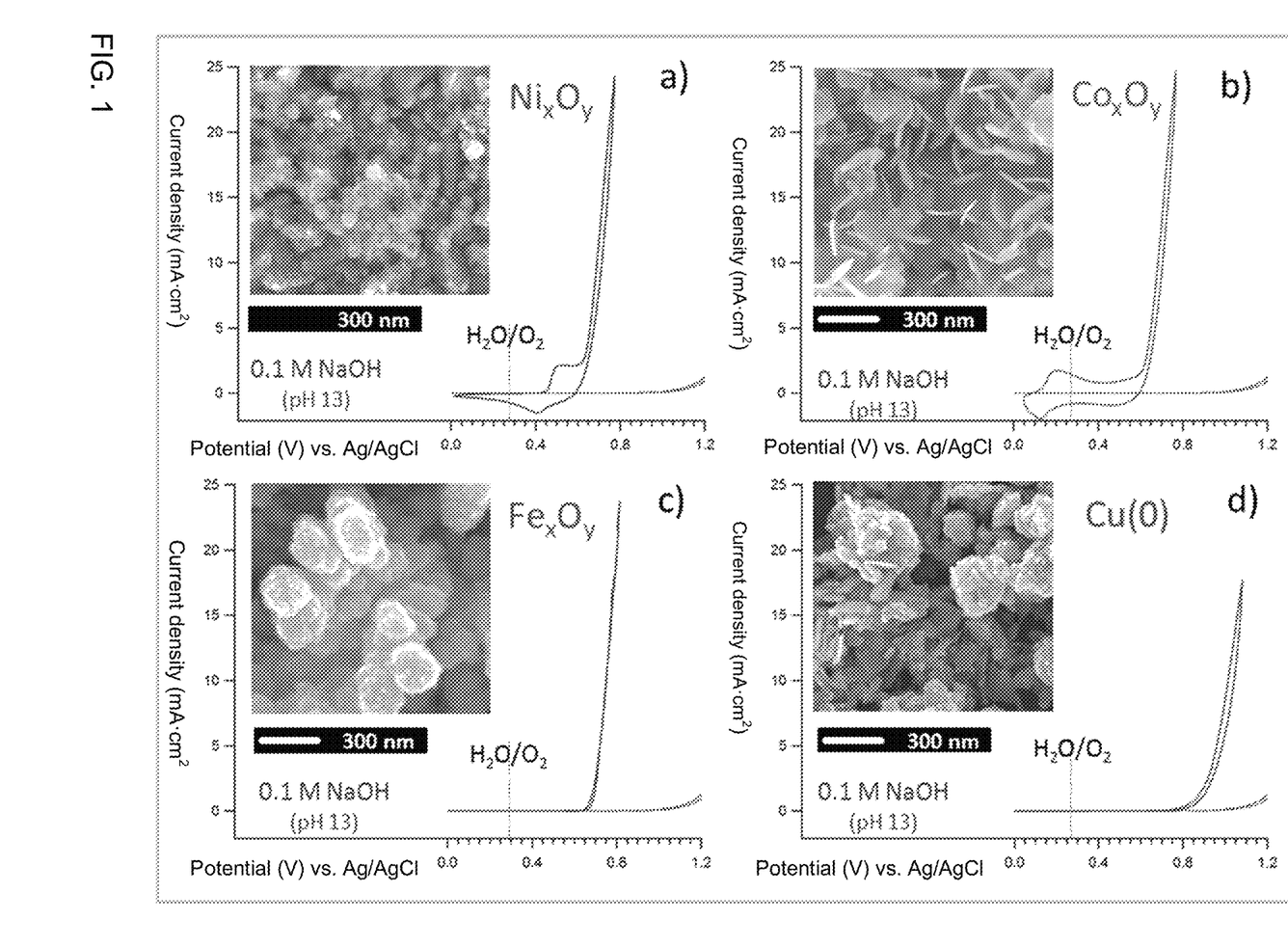
FIG. 1 shows the morphology and electrochemical properties of metal oxide FTO thin film electrodes according to the invention after the cathode deposition of Ni (a), Co (b), Fe (c) and Cu (d)
Figure 2:
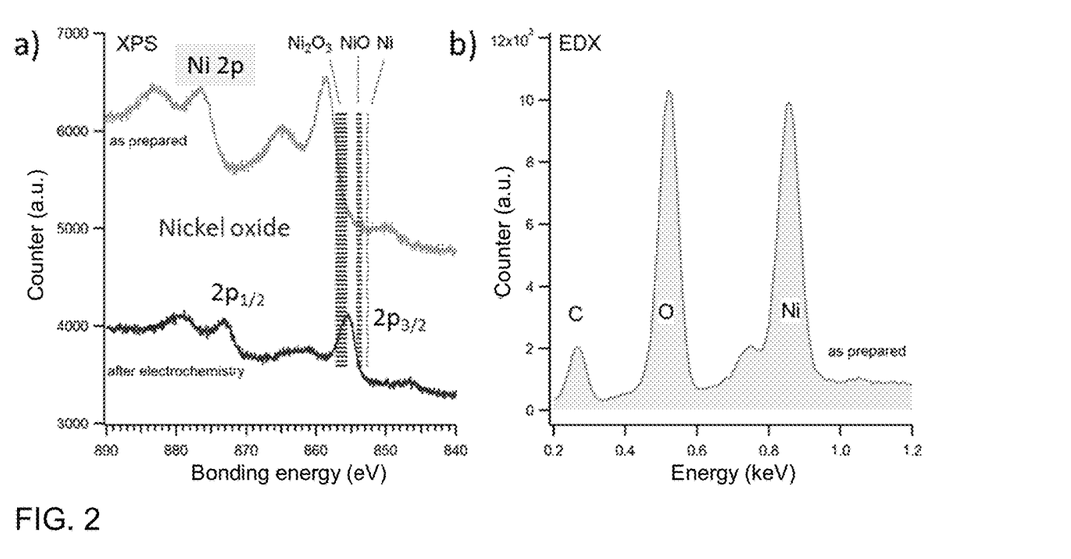
FIG. 2 shows results of the chemical analysis of an $Ni_xO_y$ layer deposited onto Si (111); a) XPS before and after anode use, b) EDX.
Figure 3:
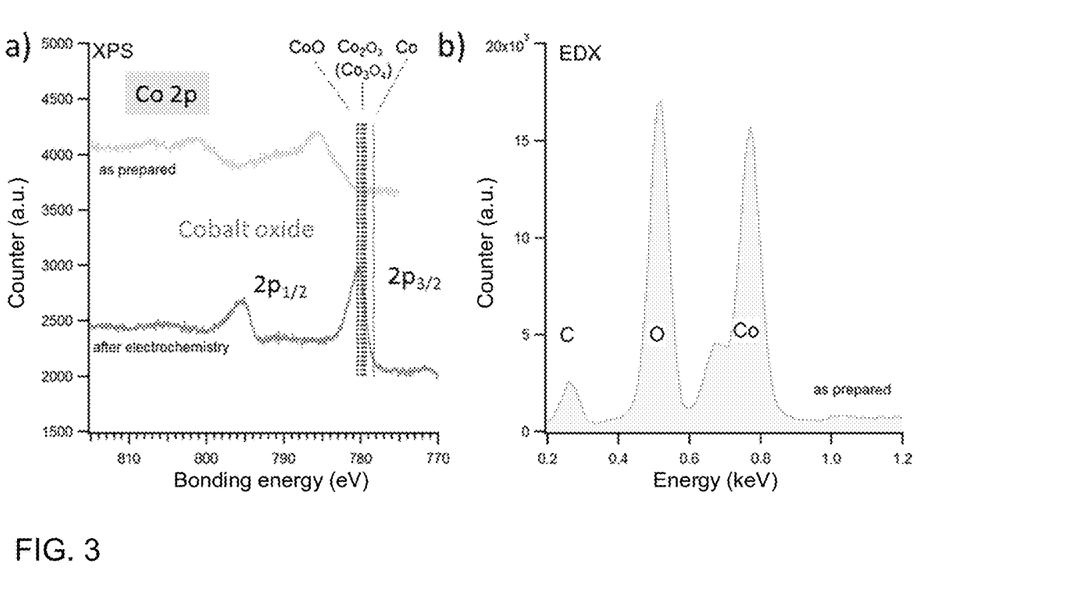
FIG. 3 shows results of the chemical analysis of a $Co_xO_y$ layer deposited onto Si (111); a) XPS before and after anode use, b) EDX.
Figure 4:
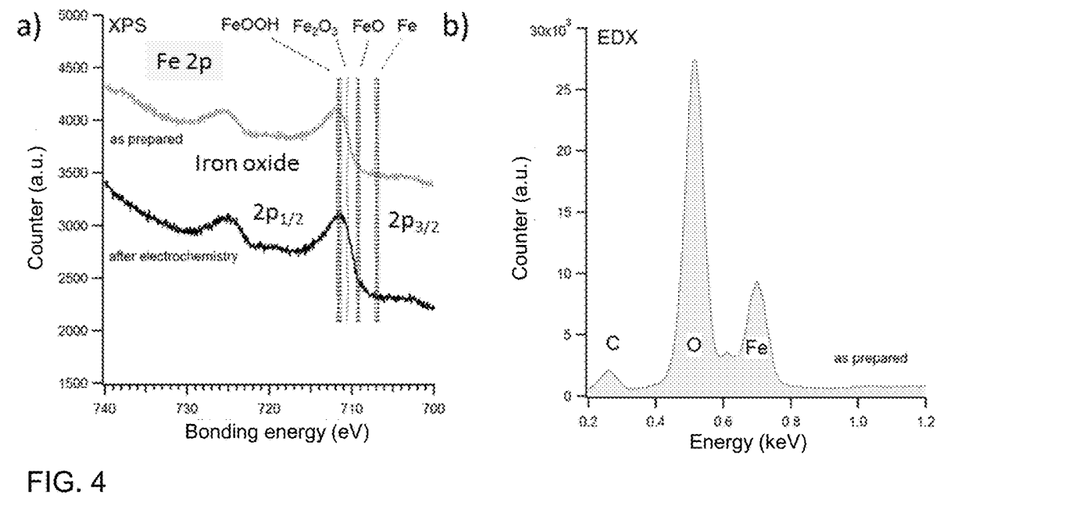
FIG. 4 shows results of the chemical analysis of a $Fe_xO_y$-layer deposited onto Si (111); a) XPS before and after anode use, b) EDX.
Figure 5:
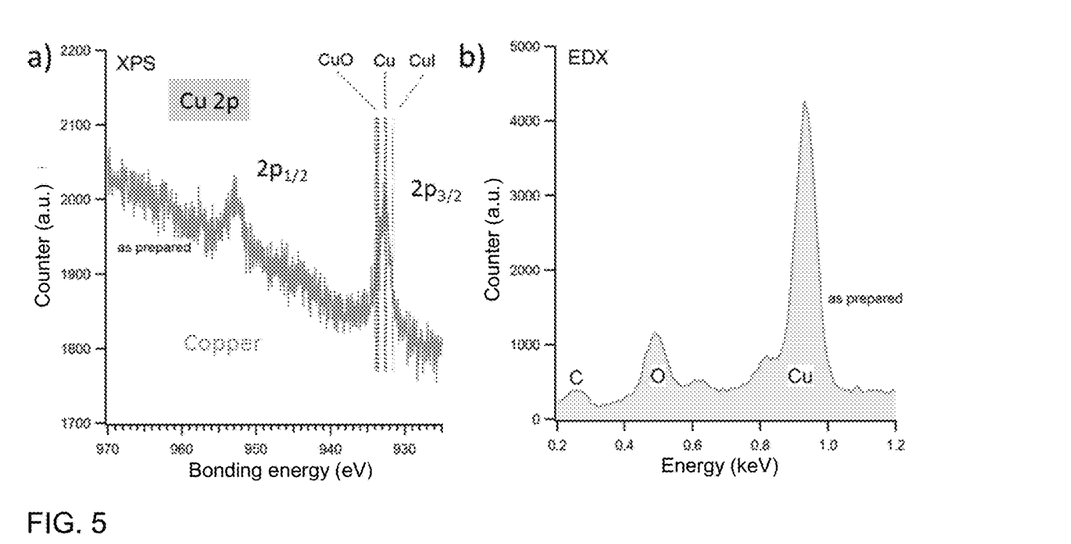
FIG. 5 shows results of the chemical analysis of a Cu(0)-layer deposited onto Si (111); a) XPS before and after anode use, b) EDX.

FIG. 1 a) to d) shows the current densities as a function of the applied potential of the thin film electrodes obtained in examples 1 to 4 during the development of oxygen in a 0.1 M NaOH solution, which were measured in the dark between 0 and 2 volt against Ag/AgCl in a three electrode configuration. By comparison the behaviour of pure FTO is shown as a dashed-line in the respective graphs. The nickel, cobalt and iron oxides show clear activity with respect to the oxygen development (FIGS. 1 a) to c)). The overpotentials determined by the curves range between 340 and 420 mV, wherein the cobalt and nickel oxide electrodes have the highest activity and the iron oxide electrodes the lowest activity. The copper electrode is only active however at high external potentials (FIG. 1 d)). The oxygen development was confirmed respectively by means of differential electrochemical mass spectroscopy (DEMS).

SEM images of the respective surfaces are also shown in FIGS. 1 a) to d). They confirm a surface morphology with a roughness in the nanometre range.

FIGS. 2 to 5 shows the results of the chemical analyses of the deposited metal oxide layers on Si(111) according to the examples 9 to 12. In this case a) shows respectively the results of the XPS analysis of the metal oxide layer after its deposition (upper graph respectively) and after the use of the electrode for electrochemical acid development (lower graph respectively). b) of FIGS. 2 to 5 shows the results of the EDX measurements of the metal oxide layers after their production (before electrochemical use).

The allocation of individual XPS signals to specific oxidation states was made more difficult by electrostatically charging the fresh oxide layers after their production (see FIGS. 2 a) to 5 a) above respectively). By comparison after the use of the electrodes for electrochemical oxygen development an allocation to different oxidation states of the metals was possible (see respectively FIGS. 2 a) to 5 a) below). For example the results in FIG. 2 a) show the simultaneous presence of Ni$_2$O$_3$ and NiO within the information depth of the method of about 2 to 3 nm.

The EDX results show for nickel, cobalt and iron the presence of bonded oxygen in the form of the corresponding oxides (see FIGS. 2 to 4 b)). In the case of copper in the deposited layer only a comparatively small amount of oxygen could be found (FIG. 5 b)), which in accordance with the XPS analysis indicates the predominant deposition of metallic copper Cu(0). In line expectations this is associated with the low activity with regard to the oxygen development (cf. FIG. 1 d)). It is assumed that the insufficient deposition of copper oxide is associated with the property of copper of forming only monovalent iodide CuI during production. During a single electron transfer from the cathode the formation of metal copper appears to be preferable to the complexing in the organic solvent and subsequent oxidation.

Interestingly carbon could be found in all of the thin films produced (FIG. 2 b) to 5 b)), which presumably originates from the used solvent (acetone).

Figure 6:
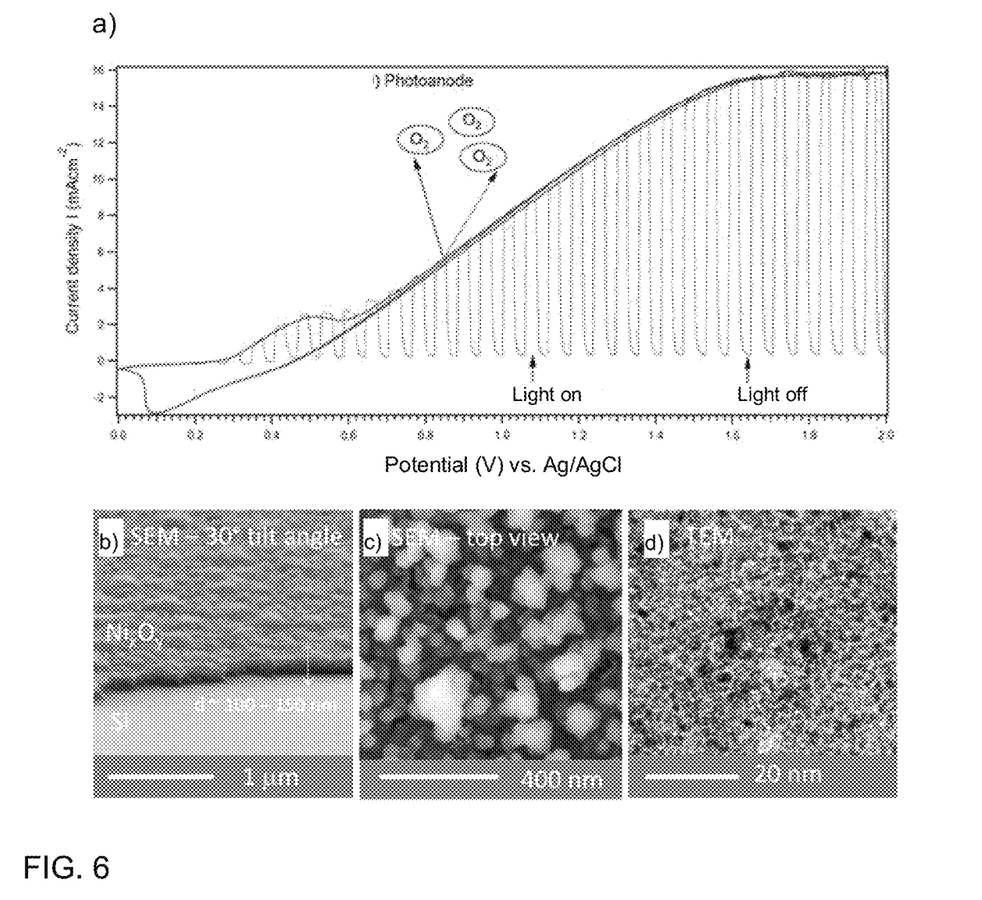
FIG. 6 shows studies on an $Ni_xO_y$/Si(100) thin film electrode; a) current voltage behaviour during photoelectrochemical oxygen development with continual illumination (continuous curve) and periodic illumination (broken curve); b) SEM image in oblique view; c) SEM image in plan view; d) TEM image in plan view.

Based on the example of the Ni$_x$O$_y$/Si(100) thin film electrode produced according to example 5 the photoelectrocatalytic behaviour is shown in FIG. 6 a). In this case the continuous curve shows the current-voltage behaviour with continuous lighting and the interrupted curve shows the current-voltage behaviour with periodic lighting. The measurements were made respectively in a three electrode configuration. It can be seen that the Ni$_x$O$_y$/Si(100) thin film electrode according to the invention has good photoactivity. However in the dark it is inactive itself with an applied voltage of 2 Volt, which is caused by the drop in current density after switching off the light.

FIGS. 6 b), c) and d) show SEM or TEM images of the Ni$_x$O$_y$/Si(100) thin film electrodes from example 5. It can be seen that the nickel oxide layer has a roughness in the nanometre range and a layer thickness of about 100 to 150 nm.

Figure 7:
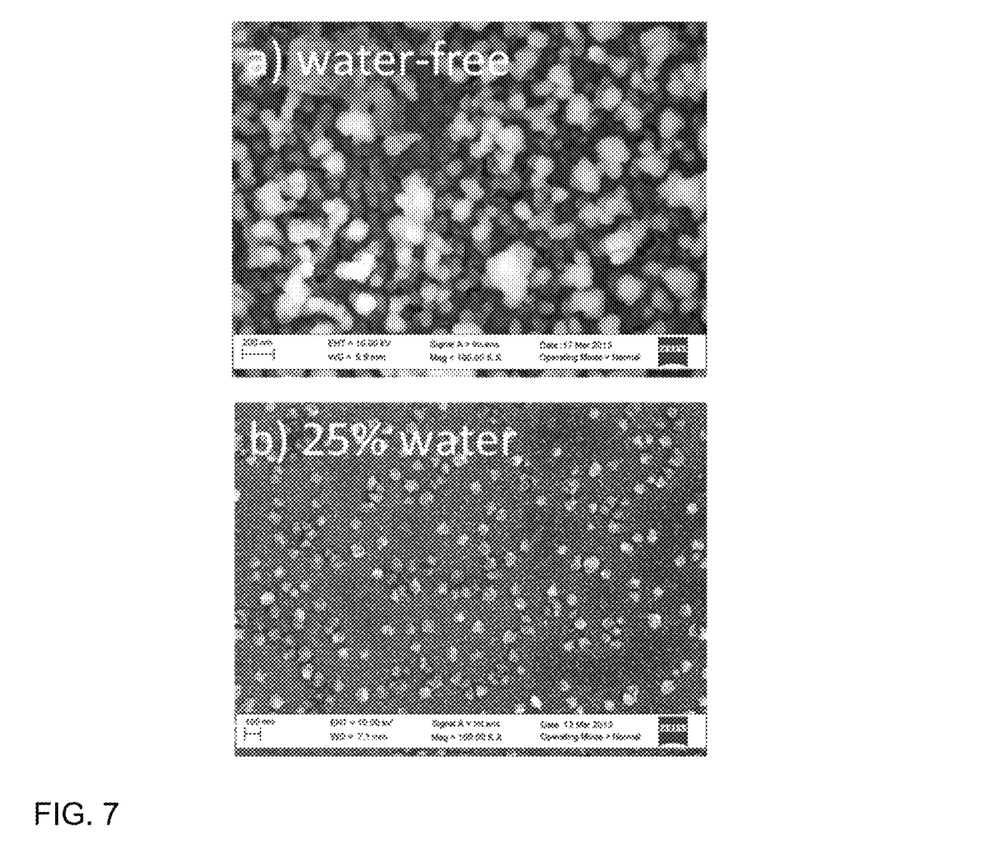
FIG. 7 SEM images of an $Ni_xO_y$/Si(100) thin film electrode; produced a) in a water-free solution according to the invention and b) in a solvent mixture with 25 vol. % $H_2O$.

FIG. 7 shows for comparison with the Ni$_x$O$_y$/Si(100) thin film electrode produced by according to the water-free method according to the invention of example 5 (FIG. 7a) the product according to comparison example 1, in which the solution contained 25 vol. % (FIG. 7b). It can be seen that the presence of water largely prevents the formation of a layer. Only individual Ni, O and C-containing islands can be observed (confirmed by EDX-analysis).

A similar result was obtained in the comparison example 2 with iron. Here too the inhibiting effect of water on the film formation was clearly evident. The resulting flat islands made EDX analysis possible which could here also show Fe, O and C in the deposited islands (results not shown).

Figure 8:
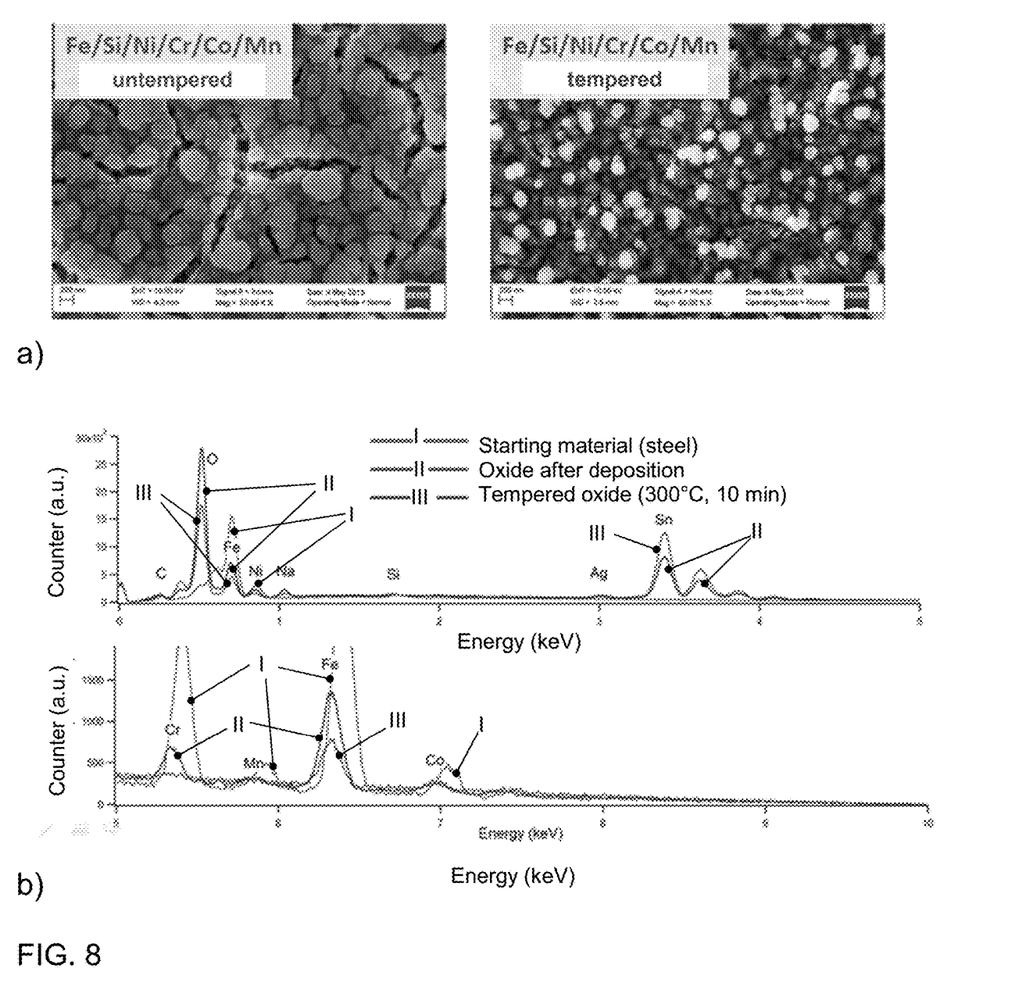
FIG. 8 shows an analysis of a Fe/Si/Ni/Cr/Co/Mn oxide layer deposited on FTO; a) SEM images before and after a thermal aftertreatment; b) EDX analysis.

FIG. 8 shows the results of the analysis of the metal oxide layer according to example 13 (before and after the thermal aftertreatment), in which a steel alloy was used as a starting material for the metal, which in addition to the main components iron and chromium contained additives of nickel, cobalt, manganese and silicon. In the EDX analysis shown in FIG. 8 b) it should be noted that the power range is shown from 0 to 5 keV at the top and from 5 to 10 keV at the bottom. The steel staring material (curve I) is shown, the metal oxide thin layer after its deposition (curve II) and after its tempering at 300° C. for 10 minutes (curve III). The EDX analysis shows that all of the elements contained in the steel are deposited onto the FTO substrate as oxides.

Figure 9:
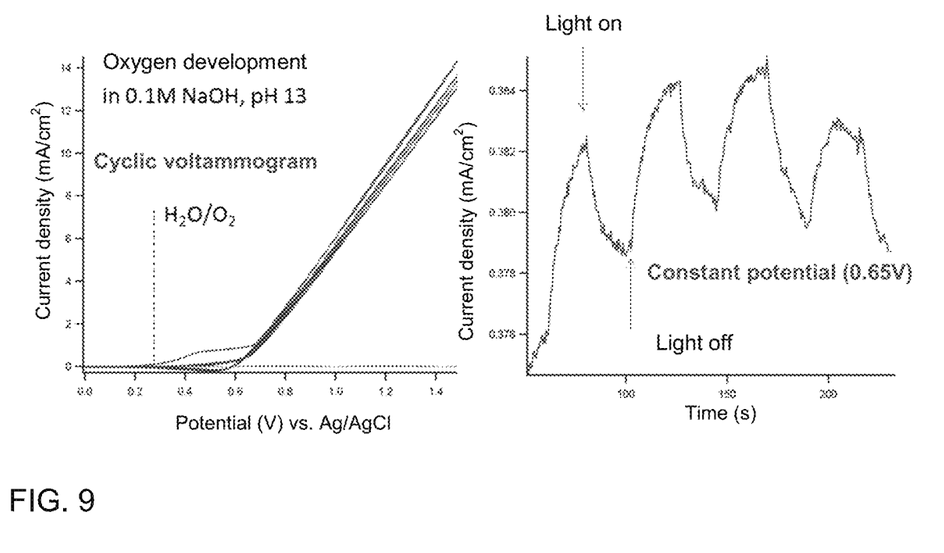
FIG. 9 shows an electrochemical investigation of a tempered Fe/Si/Ni/Cr/Co/Mn oxide/FTO electrode with regard to the electrochemical oxygen development; on the left) dark reaction with an external voltage of 0-1.4 V; on the right) intermittent illumination at a constant applied potential of 0.65 V)

FIG. 9 shows the electrochemical characterisation of the same sample as in FIG. 8 as an anode for oxygen development. In this case the left side shows the current-voltage behaviour with an applied external voltage of between 0 and 1.4 V without the action of light. The electrode shows rode an excess voltage relative to the oxygen development of about 300 mV, whereby its electrocatalytic activity is confirmed. The measurement with an applied constant potential of 0.65 Volt with intermittent illumination is shown on the right hand side of FIG. 9. This measurement confirms the photoactivity of the electrode.

The thin film produced according to example 14 with the use of CoZnO nanoparticles as a starting material for the thin film to be deposited was also analysed (results not shown). The analysis shows two different layers deposited on top of one another. A thin film of the oxides CoO and Zno could be identified immediately on the n-Si(100)-substrate, which also contained amounts of carbon. On said amorphous CoO/ZnO/C layer a second layer could be identified which consisted of deposited CoZnO particles according to the starting material. It is assumed that the two thin films of this heterostructure were produced by different reaction routes. In this case the metal oxide particles in contact with the iodine-containing solution were partly dissolved, and the metal components enter into solution as metal iodides. The following electrochemical treatment produces (in a fast reaction phase) the amorphous, carbon-containing boundary layer on the substrate. However, the remaining undissolved oxide particles (in a slower reaction phase) are deposited onto said boundary layer by electrophoretic transport.

Example 14 shows that chemically synthesised metal oxides produced as powder can be deposited by the method onto the substrate so that an (amorphous) protective layer is formed on the substrate. This enables the corrosion-free operation of the thus forming substrate/oxide heterostructure. This is an advantage particularly for light-based water splitting by using sensitive semiconductor substrates.

As a by-product of the iron oxide layer formation in example 3 in the aforementioned cathodic conditions there was still a dispersion of black particles in solution. Said particles exhibited paramagnetic properties, i.e. they were attracted by the magnetic field of a permanent magnet, without being permanently magnetised—as with ferromagnetism. For the particles in the solution this means that they disperse again and the external magnetic field is removed. The method can thus also be used to produce nanoparticles of iron or other metal materials.

The invention claimed is:

1. A method for producing a metal chalcogenide thin film electrode, comprising the steps:
   (a) contacting a metal or metal oxide with an elementary halogen in a solution comprising a non-aqueous solvent, producing a metal halide compound in the solution,
   (b) applying a negative electric voltage to an electrically conducting or semiconducting substrate which is in contact with the solution from step (a), and
   (c) during and/or after step (b), contacting the substrate with an elementary chalcogen, forming a metal chalcogenide layer on the substrate,
   wherein contacting the substrate with the elementary chalcogen is performed by contacting the substrate with a chalcogen-containing gaseous atmosphere.

2. The method according to claim 1, wherein the metal contained in the metal or metal oxide of step (a) is able to form a metal halide compound in which the metal is present in the oxidation state +2 or higher.

3. The method according to claim 1, wherein in step (b) the metal contained in the metal or metal oxide of step (a) is deposited onto the substrate by reduction, while the substrate functions as an electron transmitter during the reduction due to the negative voltage applied to the substrate.

4. The method according to claim 1, wherein the metal contained in the metal or metal oxide of step (a) comprises at least one transition metal.

5. The method according to claim 1, wherein the metal or metal oxide applied in step (a) is a solid metal body.

6. The method according to claim 1, wherein the elementary chalcogen is elementary oxygen, elementary sulphur or elementary selenium.

7. The method according to claim 1, wherein the substrate comprises an n-semiconductor material.

8. The method according to claim 1, wherein the elementary halogen is iodine ($I_2$) or bromine ($Br_2$).

9. The method according to claim 1, wherein the non-aqueous solvent is an organic solvent.

10. The method according to claim 1, wherein a proportion of water in the non-aqueous solvent is at most 0.2 wt. %.

11. The method according to claim 1, comprising the step: (d) thermal after treatment of the substrate comprising the metal chalcogenide layer.

12. The method according to claim 4, wherein the transition metal is selected from the group consisting of: iron, cobalt, nickel, a mixture or alloy thereof.

13. The method according to claim 5, wherein the solid metal body is an industrial metal or scrap metal.

14. The method according to claim 7, wherein the n-semiconductor material is selected from n-doped silicon and fluorine-doped tin oxide (FTO).

15. The method according to claim 9, wherein the organic solvent comprises a carbonyl group or cyanide group.

16. The method according to claim 1, wherein the non-aqueous solvent is one of acetone and acetonitrile.

* * * * *